United States Patent
Jeon

(10) Patent No.: US 7,593,635 B2
(45) Date of Patent: Sep. 22, 2009

(54) DIGITAL IMAGING APPARATUS CAPABLE OF CREATING PANORAMA IMAGE AND A CREATING METHOD THEREOF

(75) Inventor: Seung-chul Jeon, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 11/186,824

(22) Filed: Jul. 22, 2005

(65) Prior Publication Data

US 2006/0023276 A1    Feb. 2, 2006

(30) Foreign Application Priority Data

Jul. 27, 2004    (KR) .................. 10-2004-0058551

(51) Int. Cl.
*G03B 17/24* (2006.01)
*G03B 41/00* (2006.01)

(52) U.S. Cl. ........................... 396/322; 396/310

(58) Field of Classification Search ............. 396/310, 396/311, 322, 323, 324, 335; 348/207.99, 348/208.4, 208.6, 208.12, 222.1, 262
See application file for complete search history.

(56) References Cited

U.S. PATENT DOCUMENTS

| | | | | |
|---|---|---|---|---|
| 6,075,905 A | * | 6/2000 | Herman et al. | 382/284 |
| 6,535,650 B1 | * | 3/2003 | Poulo et al. | 382/284 |
| 2004/0056966 A1 | * | 3/2004 | Schechner et al. | 348/229.1 |
| 2004/0071367 A1 | * | 4/2004 | Irani et al. | 382/284 |
| 2004/0076340 A1 | * | 4/2004 | Nielsen | 382/284 |
| 2005/0122400 A1 | * | 6/2005 | Kochi et al. | 348/207.99 |
| 2005/0261849 A1 | * | 11/2005 | Kochi et al. | 702/85 |
| 2006/0104541 A1 | * | 5/2006 | Baker et al. | 382/284 |

FOREIGN PATENT DOCUMENTS

| | | |
|---|---|---|
| CN | 1455583 A | 11/2003 |
| JP | 9-034039 A | 2/1997 |
| JP | 2000-253391 | 9/2000 |
| JP | 2001-169223 | 6/2001 |
| JP | 2003-308526 A | 10/2003 |
| KR | 10-2003-0064437 A | 8/2003 |

* cited by examiner

*Primary Examiner*—Rodney E Fuller
(74) *Attorney, Agent, or Firm*—Roylance, Abrams, Berdo & Goodman, LLP

(57) ABSTRACT

A digital imaging apparatus for creating a panorama image and a method thereof, wherein the digital imaging apparatus comprises a capture part for consecutively capturing a plurality of images, an image information detection part for detecting image information regarding the plurality of images output from the capture part, respectively, and a panorama image generation part for converting the plurality of images based on the image conversion information. The image conversion information is determined by selecting one set of the plurality of image information output from the image information detection part, converting the image information regarding the plurality of images output from the capture part using the selected image information, and combining the converted images, thereby creating a natural-looking panorama image.

11 Claims, 2 Drawing Sheets

DIGITAL IMAGING APPARATUS CAPABLE OF CREATING PANORAMA IMAGE AND A CREATING METHOD THEREOF

CROSS-REFERENCE TO RELATED APPLICATIONS

This application claims the benefit under 35 §119(a) of Korean Patent Application No. 10-2004-0058551, filed in the Korean Intellectual Property Office on Jul. 27, 2004, the entire disclosure of which is incorporated herein by reference.

BACKGROUND OF THE INVENTION

1. Field of the Invention

The present invention relates to a digital imaging apparatus. More specifically, the present invention relates to a digital imaging apparatus for creating a natural-looking panorama image by connecting images that are converted using lens distortion information and exchangeable image file (EXIF) information, and a panorama image creating method thereof.

2. Description of the Related Art

A general photographing apparatus has a limited image size that can be represented in one shot. Therefore, in order to form a wider-angled image, a plurality of still images are connected with each other. Such a technique is referred to as a 'panorama image'.

Recently, the 'panorama image' function has also been introduced into digital cameras and digital camcorders.

FIG. 1 is a block diagram of a conventional digital imaging apparatus that is capable of creating a panorama image.

Referring to FIG. 1, the conventional digital imaging apparatus comprises a lens 10 for optically acquiring an image of an object, a charge-coupled device (CCD) 20 for converting an output from the lens 10 into digital information, a first storage part 30 for storing an output from the CCD 20, a panorama image generation part 40 for detecting and connecting the boundaries of a plurality of images stored to the first storage part 30, and a second storage part 50 for storing the panorama images generated in the panorama image generation part 40.

The digital images captured by the above-structured digital imaging apparatus can be reviewed in a real time basis. Therefore, the boundaries between the images are detected using the image information of the plurality of images, and a new image is formed by connecting the detected boundaries of the images.

To be more specific, the conventional digital imaging apparatus stores data of a plurality of still images captured by the lens 10 and the CCD 20 to the first storage part 30, detects the boundaries between the images based on pure image data in the panorama image generation part 40, connects the boundaries to one another to form a new joint photographic experts group (JPEG) image, and stores the JPEG image to the second storage part 50.

Here, when the plurality of still images are not consecutive, the boundaries of the generated JPEG image do not look smooth and natural, and accordingly, the new JPEG image also looks unnatural due to image capturing conditions which are respectively different.

In order to overcome the unnaturalness in the boundaries, a method has been suggested in which the digital imaging apparatus displays a part of a pre-captured image through a liquid crystal display (LCD) and then captures a new image, such that the boundaries of the new image correspond to the boundaries of the displayed image. However, since the distortion information of the lens varies in every case of image capturing, and the capturing conditions also vary according to objects, it is hard to create a natural-looking panorama image.

Accordingly, a need exists for a system and method for creating a natural-looking panorama image using still images, even in the case of nonconsecutive still images.

SUMMARY OF THE INVENTION

An aspect of the present invention is to solve at least the above and other problems and disadvantages, and provide at least the advantages described below. Accordingly, an aspect of the present invention is to provide a digital imaging apparatus for creating a panorama image by converting respective image information regarding a plurality of images obtained from the digital imaging apparatus so that the converted image information corresponds to one set of specific predetermined image information and creating a panorama image using the converted image information, and a creating method thereof.

In order to achieve the above-described and other aspects of the present invention, a digital imaging apparatus is provided for creating a panorama image comprising a capture part for consecutively capturing a plurality of images, an image information detection part for detecting image information regarding the plurality of images output from the capture part, respectively, and a panorama image generation part for converting the plurality of images based on the image conversion information. The image conversion information is determined by selecting one set of the plurality of image information output from the image information detection part, converting the image information regarding the plurality of images output from the capture part using the selected image information, and combining the converted images, thereby creating a panorama image.

The capture part comprises a lens part for outputting a produced optical image of an object, and an imaging device for photoelectrically converting the optical image.

The image information detection part comprises a lens distortion information detection part for detecting lens distortion information from the output of the lens part, and an exchangeable image file (EXIF) information detection part for detecting EXIF information from the output of the imaging device.

The EXIF information comprises at least one of a focal distance, an F-number, and an exposure time.

The image conversion information is comprised of at least one of lens distortion information that corresponds to a middle value that is detected between first-input lens distortion information and last-input lens distortion information selected from among a plurality of lens distortion information output from a lens distortion information detector.

The image conversion information is further comprised of first-input EXIF information selected from among the plurality of EXIF information output from an EXIF information detector.

The digital imaging apparatus may further comprise a source image storage part for storing the plurality of images output from the capture part.

Another aspect of the preset invention is to provide a method for creating a panorama image using a digital imaging apparatus comprising the steps of consecutively capturing and inputting a plurality of images, detecting image information regarding the plurality of input images, respectively, determining image conversion information by selecting one set of the plurality of detected image information, converting the plurality of images based on the determined image conversion information, and combining the plurality of converted images, thereby creating a panorama image.

The image information comprises lens distortion information and EXIF information.

The EXIF information comprises at least one of a focal distance, an F-number, and an exposure time.

In the step of determining image conversion information, the image conversion information is comprised of one set of lens distortion information that corresponds to a middle value that is detected between first-input lens distortion information and last-input lens distortion information from among a plurality of lens distortion information.

Further, in the step of determining image conversion information, the image conversion information is comprised of first-input EXIF information selected from among the plurality of EXIF information.

BRIEF DESCRIPTION OF THE DRAWING FIGURES

The above aspects and other features of the present invention will become more apparent by describing in detail exemplary embodiments thereof with reference to the attached drawing figures, wherein.

Throughout the drawings, like reference numerals will be understood to refer to like parts, components and structures.

DETAILED DESCRIPTION OF THE EXEMPLARY EMBODIMENTS

Figure 1:
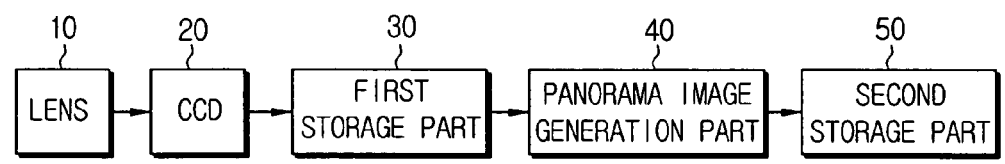
FIG. 1 is a block diagram of a conventional digital imaging apparatus for creating a panorama image.

Hereinafter, an exemplary embodiment of the present invention will be described in detail with reference to the accompanying drawing figures.

In the following description, the same drawing reference numerals are used for the same elements throughout the drawings. The matters defined in the description, such as detailed construction and element descriptions, are provided to assist in a comprehensive understanding of the invention. Also, functions or constructions well known to those skilled in the art are omitted for clarity and conciseness.

Figure 2:
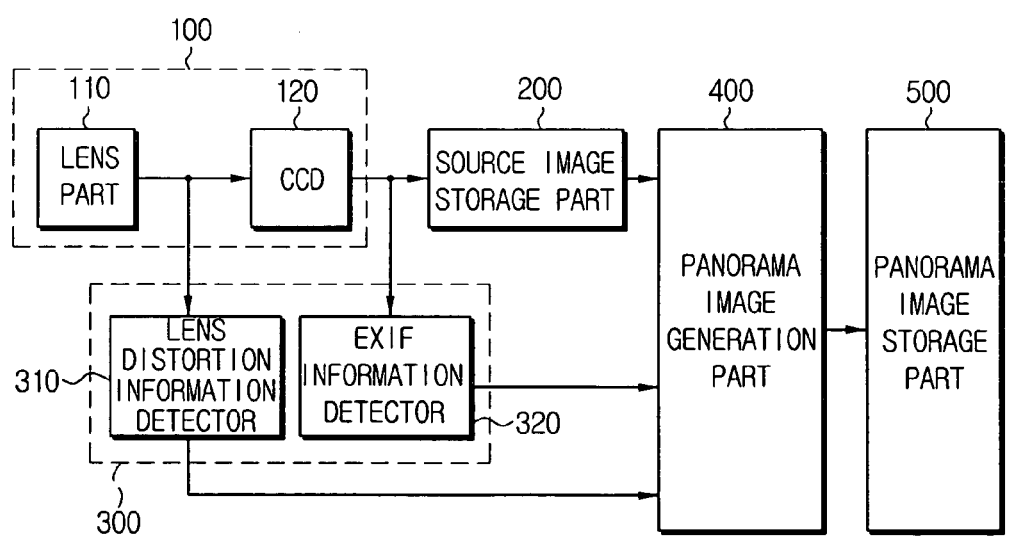
FIG. 2 is a block diagram of a digital imaging apparatus for creating a panorama image according to an embodiment of the present invention.

FIG. 2 is a block diagram of a digital imaging apparatus for creating a panorama image according to an embodiment of the present invention.

Referring to FIG. 2, the digital imaging apparatus according to an embodiment of the present invention comprises a capture part 100, a source image storage part 200, an image information detection part 300, a panorama image generation part 400, and a panorama image storage part 500.

The capture part 100 comprises a lens part 110 for outputting a produced optical image of an object to consecutively capture a plurality of images, and a charge-coupled device (CCD) 120 used as an imaging device for photoelectrically converting the optical image output from the lens part 110.

The source image storage part 200 stores an image output from the lens part 110 and the CCD 120. The image stored to the source image storage part 200 is pure image data for generating a panorama image.

The image information detection part 300 detects respective image information regarding the plurality of images output from the capture part 100 and comprises a lens distortion information detector 310 and an exchangeable image file (EXIF) information detector 320.

The lens distortion information detector 310 detects lens distortion information from the output of the lens part 110.

The lens distortion information refers to concaveness of the lens, which varies on all occasions, even with the same digital imaging apparatus and the same lens.

The EXIF information detector 320 detects EXIF information from the output of the CCD 120. The EXIF information refers to additional data with respect to the image, which may comprise a capturing date, a shutter speed, a focal distance, an F-number (a distance from a lens to an object when focusing the lens), an exposure time, a zoom magnification, a resolution, and an iris numeric. In an exemplary embodiment of the present invention provided for illustrative purposes, the focal distance, the F-number, and the exposure time are used, which are basic offerings of a general digital imaging apparatus.

The panorama image generation part 400 selects any one set of the plurality of image information outputs from the image information detection part 300 and determines image conversion information, such that the respective different sets of image information regarding the plurality of images can conform to one set of image information (that is, conform to the selected set of image information).

In an exemplary embodiment of the present invention, the panorama image generation part 400 determines at least one set of lens distortion information as the image conversion information. This is selected to be the lens distortion information that corresponds to the middle value that is detected between first-input lens distortion information and last-input lens distortion information from among a plurality of lens distortion information output from the lens distortion information detector 310.

In addition, the panorama image generation part 400 determines first-input EXIF information as the image conversion information selected from among a plurality of EXIF information output from the EXIF information detector 320. The image conversion information for the focal distance, the F-number, and the exposure time of the EXIF information are also determined in substantially the same manner.

When any one set of the plurality of lens distortion information, the focal distance, the F-number, and the exposure time is selected and the image conversion information is determined, the panorama image generation part 400 converts the plurality of images stored to the source image storage part 200, respectively, based on the determined image conversion information.

As the lens distortion information of the plurality of images is converted by the panorama image generation part 400, the plurality of images which are separately captured, seem to now be captured through the same lens. By converting the focal distances and the F-numbers of the plurality of images, the respective images are enlarged or reduced and therefore, seem to now be captured at the same distance. By converting the exposure time, the respective images seem to now be captured at the same brightness.

The panorama image storage part 500 stores the plurality of images that are converted to have the same image information in the panorama image generation part 400. The plurality of images may be joint photographic experts group (JPEG) files.

Figure 3:
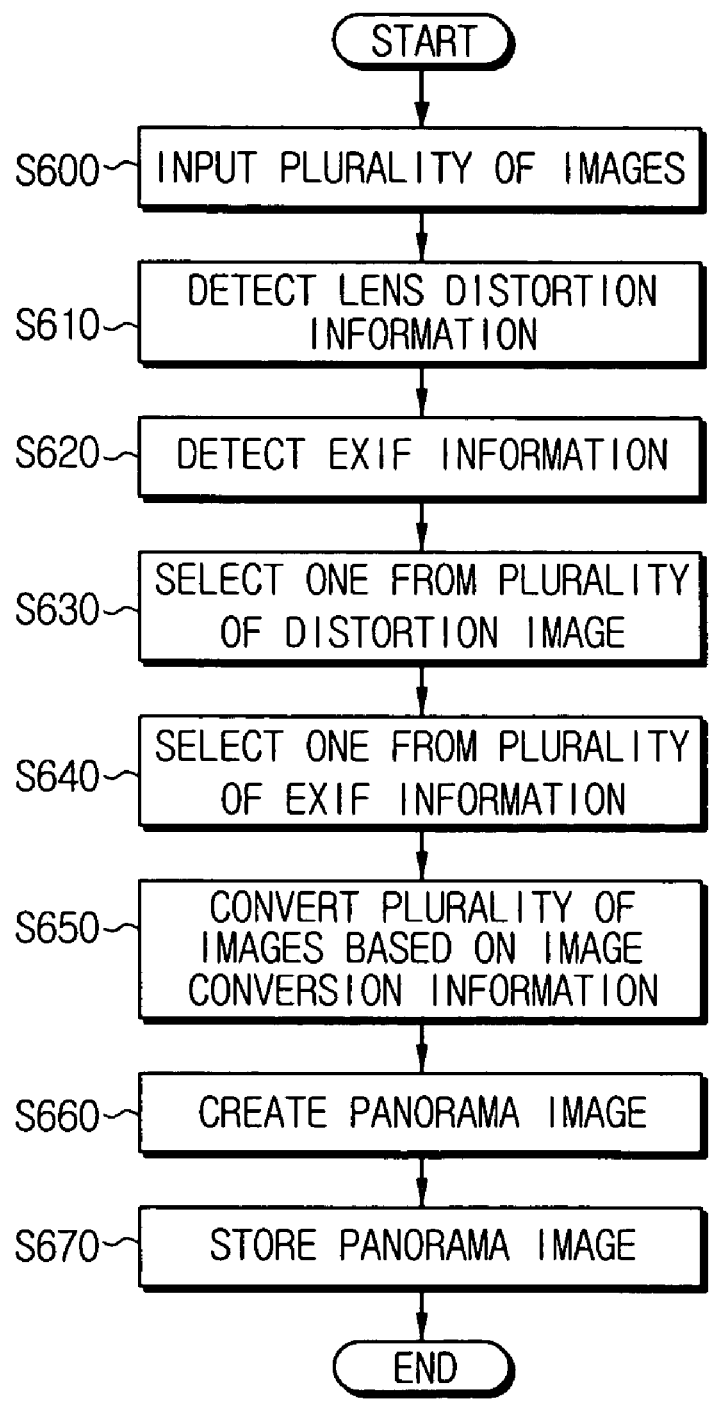
FIG. 3 is a flowchart for illustrating a method for creating a panorama image using a digital imaging apparatus according to an embodiment of the present invention.

Hereinbelow, a method for creating a panorama image using a digital imaging apparatus according to an embodiment of the present invention will be described with reference to FIGS. 2 and 3.

When a user captures consecutive or nonconsecutive images using the digital imaging apparatus, the images are captured through the lens part 110 and the CCD 120 and input in order at step (S600).

When the images are output from the lens part 110, the lens distortion information detector 310 detects lens distortion information from the output of the lens part 110 at step (S610).

When the photoelectrically converted image is output from the CCD 120, the EXIF information detector 320 detects EXIF information from the output of the CCD 120 at step (S620). Here, information such as the focal distance, the F-number, and the exposure time are respectively detected as the EXIF information.

When the lens distortion information is input from the lens distortion information detector 310, the panorama image generation part 400 selects one set of lens distortion information that corresponds to a middle value that is detected between first-input lens distortion information and last-input lens distortion information from among the plurality of input lens distortion information to determine the image conversion information at step (S630).

When the EXIF information is input from the EXIF information detector 320, the panorama image generation part 400 selects the first-input EXIF information from among the plurality of input EXIF information to determine the image conversion information at step (S640).

After determining the image conversion information in steps (S630) and (S640), the panorama image generation part 400 reads the images stored to the source image storage part 200 and converts the plurality of images, respectively, based on the image conversion information, that is, the selected lens distortion information and EXIF information at step (S650).

When the respective image information regarding the plurality of images is converted in step (S650), the panorama image generation part 400 then combines the plurality of converted images to produce a panorama image at step (S660).

The panorama image produced by the panorama image generation part 400 is then stored as a JPEG image to the panorama image storage part 500 at step (S670).

The method for creating the panorama image is substantially the same as the conventional method in that boundaries of the plurality of images are connected. However, according to an embodiment of the present invention, the lens distortion information and the EXIF information of the plurality of different images are converted to match a single image, and therefore, a natural-looking panorama image can be obtained as if the images are captured in the same conditions.

The method for creating a panorama image according to an embodiment of the present invention is applicable to all kinds of imaging apparatuses which can produce a JPEG image, such as a digital camera, digital camcorder, and the like.

As can be appreciated from the above description, by converting and combining different image information regarding a plurality of images, including the different image information such as the lens distortion information and the EXIF information, a natural-looking panorama image can be implemented.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A digital imaging apparatus for creating a panorama image, comprising:
   a capture part for capturing a plurality of images;
   an image information detection part for detecting image information regarding the plurality of images output from the capture part, respectively; and
   a panorama image generation part for determining image conversion information and converting the plurality of images based on the image conversion information, wherein the panorama image generation part is configured to determine the image conversion information by selecting one set of the plurality of image information output from the image information detection part, convert the image information regarding the plurality of images output from the capture part using the selected image information, and combining the converted images thereby creating a panorama image,
   wherein the image information comprises lens distortion information and EXIF information.

2. The digital imaging apparatus of claim 1, wherein the capture part comprises:
   a lens part for outputting a produced optical image of an object; and
   an imaging device for photoelectrically changing the optical image.

3. The digital imaging apparatus of claim 2, wherein the image information detection part comprises:
   a lens distortion information detection part for detecting the lens distortion information from the output of the lens part; and
   an exchangeable image file (EXIF) information detection part for detecting the EXIF information from the output of the imaging device.

4. The digital imaging apparatus of claim 3, wherein the EXIF information comprises at least one of a focal distance, an F-number, and an exposure time.

5. The digital imaging apparatus of claim 3, wherein the image conversion information comprises one set of lens distortion information that corresponds to a middle value that is detected between first-input lens distortion information and last-input lens distortion information from among a plurality of lens distortion information output from the lens distortion information detection part.

6. The digital imaging apparatus of claim 3, wherein the image conversion information comprises first-input EXIF information selected from among the plurality of EXIF information output from the EXIF information detection part.

7. The digital imaging apparatus of claim 1, further comprising a source image storage part for storing the plurality of images output from the capture part.

8. A method for creating a panorama image using a digital imaging apparatus, comprising the steps of:
   capturing and inputting a plurality of images;
   detecting image information regarding the plurality of input images, respectively;
   determining image conversion information by selecting one set of the plurality of detected image information;
   converting the plurality of images based on the determined image conversion information; and
   combining the plurality of converted images to thereby create a panorama image,
   wherein the image information comprises lens distortion information and EXIF information.

9. The method of claim 8, wherein the EXIF information comprises at least one of a focal distance, an F-number, and an exposure time.

10. The method of claim 8, wherein the step of determining image conversion information comprises the step of:
    determining the image conversion information to comprise one set of lens distortion information that corresponds to a middle value that is detected between first-input lens distortion information and last-input lens distortion information from among a plurality of lens distortion information.

11. The method of claim 8, wherein the step of determining image conversion information comprises the step of:
    determining the image conversion information to comprise first-input EXIF information selected from among the plurality of EXIF information.

* * * * *

UNITED STATES PATENT AND TRADEMARK OFFICE
CERTIFICATE OF CORRECTION

PATENT NO. : 7,593,635 B2 Page 1 of 1
APPLICATION NO. : 11/186824
DATED : September 22, 2009
INVENTOR(S) : Seung-chul Jeon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 951 days.

Signed and Sealed this

Twenty-first Day of September, 2010

David J. Kappos
*Director of the United States Patent and Trademark Office*